June 5, 1928.
R. E. HOWELL
LAND AND WATER VEHICLE
Filed May 19, 1927
1,672,613
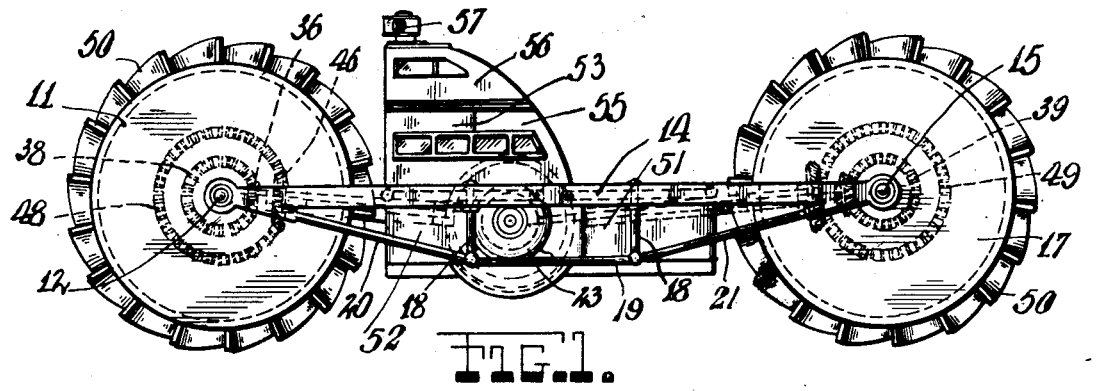
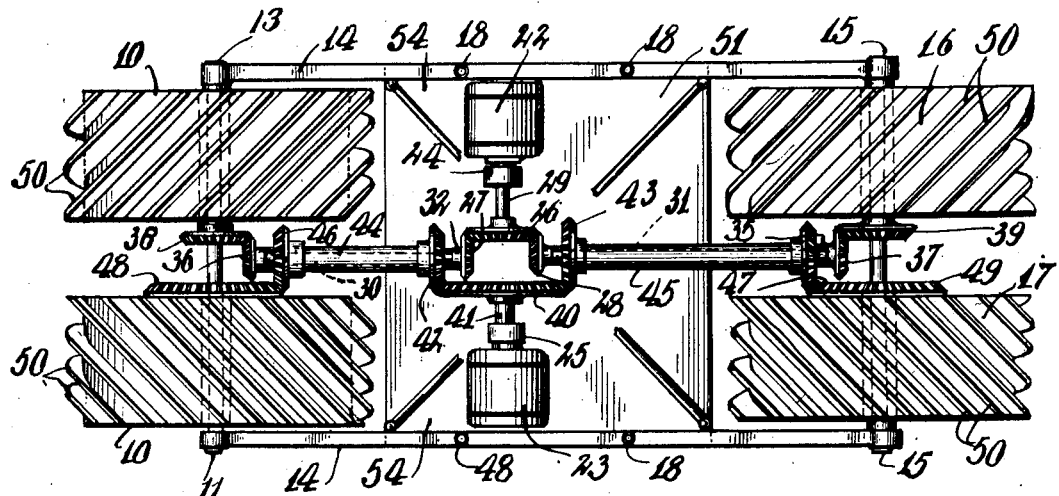
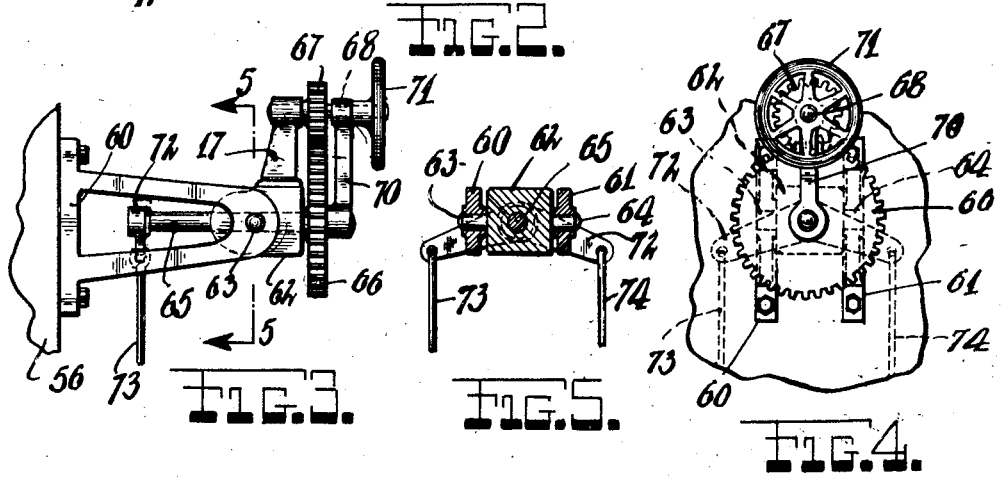
INVENTOR
Ralph E. Howell
BY
ATTORNEY Patented June 5, 1928.

1,672,613

UNITED STATES PATENT OFFICE.

RALPH E. HOWELL, OF NEW YORK, N. Y.

LAND AND WATER VEHICLE.

Application filed May 19, 1927. Serial No. 192,545.

This invention relates to a new and useful device in the nature of a land and water vehicle, comprising a means of propelling the said vehicle which is especially adapted for use on both land and water.

The object of the invention is to provide a land and water vehicle of novel construction and arrangement of parts, hereinafter more fully described, claimed and illustrated in the accompanying drawing.

Fig. 1 is a side elevational view of my improved land and water vehicle.

Fig. 2 is a top plan view of the operating mechanism as embodied in my improved device.

Fig. 3 is an enlarged detail view of the control mechanism.

Fig. 4 is a front elevational view thereof.

Fig. 5 is a sectional view taken on the line 5—5 of Fig. 3.

As here embodied my improved device comprises drums 10 and 11 of hollow cylindrical construction, air tight, a partial vacuum being created therein. The drums 10 and 11 are rotatively mounted on the shaft 12, carried by the longitudinal supports 13 and 14. The drums 10 and 11 are positioned approximately adjacent, intermediate the supports 13 and 14. The supports 13 and 14 are extended from the shaft 12. The shaft 15 is carried by the extended extremity of the supports 13 and 14. Identical drums 16 and 17, are rotatively mounted on the shaft 15, and are similarly positioned on the shaft 15.

The struts 18 are secured to the central portion of the supports 13 and 14, and are extended downwardly therefrom. The platform 19 is secured to the extended extremities of the struts 18. The tie rods 20 and 21, are secured to the opposite sides of the platform 19 and are extended therefrom, and are secured to the supports 13 and 14 adjacent to the extremities of the said supports.
The latter described construction is such as will provide a strong platform.

The internal combustion motors 22 and 23 of the usual type and construction are equipped with usual clutches 24 and 25, respectively, and are mounted on the platform 19 oppositely positioned.

The bevel gear 26 is attached to the extended extremity of the clutch shaft 29, and meshes with the bevel pinions 27 and 28 secured to the shafts 30 and 31, respectively, rotatively mounted in the brackets 32, 33, and 34, 35, respectively, secured to the platform 19. The shafts 30 and 31 are extended, longitudinally in opposite directions from the bevel gear 26. The bevel pinions 36 and 37 are attached to the extended extremities of the shafts 30 and 31, respectively, and mesh with the bevel gears 38 and 39 attached to the drums 10 and 16, respectively. The above described construction is such as will permit the motor 22, to drive or rotate the drums 10 and 16.

The bevel gear 40 is attached to the extended extremity of the clutch shaft 41 and meshes with the bevel pinions 42 and 43, secured to the tubular members 44 and 45, respectively, rotatively engaging over or rotatively mounted on the shafts 30 and 31, respectively. The bevel pinions 46 and 47 are attached to the extended extremities of the tubular members 44 and 45, respectively, and mesh with the bevel gears 48 and 49, attached to the drums 11 and 17, respectively. The above described construction is such as will permit the motor 23, to drive or rotate the drums 11 and 17.

It should be understood that my improved land and water vehicle is propelled over land by means of the angularly extended elements 50 attached to the drums 10, 11, 16, and 17, and through the water in a similar manner, the said drums being air tight and buoyant so as to float the said vehicle on the water, I have also provided a fuel tank 51 and oil tank 52 mounted on the platform 19, suitably connected to the motors 22, and 23. I have also provided a cabin 53, or compartment, erected on the supports 13 and 14, to provide suitable quarters for passengers. I have also provided spaces 54 adapted to accommodate mail, freight, express or the like. The cabin 53 is provided with an anteroom 55, adapted to house a wireless or radio instrument. The pilot house 56 is constructed over the cabin 53, and is adapted to house the control mechanism hereinafter described and set forth. A suitable light 57 is mounted on the roof of the pilot house 56.

As here embodied the control mechanism comprises brackets 60 and 61, secured to the wall of the pilot-house, and extended therefrom, horizontally. The block 62 is provided with extended portions 63 and 64, pivotally mounted in apertures formed in the exended extremities of the brackets 60 and 61. The block 62 is provided with an aperture adapted to rotatively receive the shaft 65. The gear 66 is secured to the shaft 65, and meshes with the pinion 67, secured to the shaft 68, rotatively mounted in the bracket 69, secured to the block 62, and similarly mounted in the bracket 70, supported by the shaft 65. The hand wheel 71 is secured to the shaft 68. The lever 72 or arm is attached at its center to the shaft 65. The flexible members 73 and 74 or control cords, are attached to the extended extremities of the lever 72 and are attached to the carburetors, not shown on the accompanying drawing, of the motors 22 and 23, respectively.

The above described construction is such as will permit my improved vehicle to be propelled straight ahead, when the hand wheel 71 is pivoted downwardly. The said construction is also such as will permit the motor 22 to rotate the drums 10 and 16 or the motor 23, to rotate the drums 11 and 17, when the hand wheel 71 is turned or rotated to the left or to the right, respectively.

Having thus described my invention, what I claim as new and desire to protect by Letters Patent of the United States is as follows:

1. In a land and water vehicle of the class described, a hand wheel secured to a shaft, a pinion secured thereto, adapted to mesh with a gear secured to a second shaft, said second shaft rotatively mounted in a block pivotally attached to brackets, a lever secured to the said second shaft, control rods attached to the extended extremities of the said lever, and to the carburetors of an internal combustion motor and a second internal combustion motor, so as to permit the said internal combustion motors to propel the said vehicle in a straight ahead position, to the right or to the left.

2. In a land and water vehicle of the class described, a frame, laterally disposed shafts rigidly mounted on said frame at the front and rear extremities thereof, a pair of spaced apart drums rotatively mounted on each of said shafts, a gear rigidly attached to each of said drums, a prime mover mounted on the right side of said frame and operatively connected with the right hand drums of said front and rear pairs of drums, a second prime mover mounted on the left hand side of said frame and operatively connected with the left hand drums of said front and rear pairs of drums, and controlling mechanism supported by said frame and operatively connected with said prime movers for regulating the flow of fuel thereto to effect steering of said vehicle by actuating the drums on one side thereof independently of the drums on the other side.

3. In a land and water vehicle of the class described, a frame, laterally disposed shafts rigidly mounted on said frame at the front and rear extremities thereof, a pair of spaced apart drums rotatively mounted on each of said shafts, a gear rigidly attached to each of said drums, spaced apart prime movers mounted on opposite sides of said frame, a gear on the shaft of each of said prime movers, driving means comprising tublar shafts operatively connected with the gear of one of said prime movers and with the gears of the drums of one side of said frame, a second driving means comprising shafts disposed through the aforesaid tubular shafts and operatively connected with the gear of the other prime mover and with the gears of the drums on the other side of said frame, and means comprising a hand wheel supported on said frame and operatively connected with said prime movers for selectively controlling the supply of energy thereto for effecting steering of said vehicle.

4. In a land and water vehicle of the class described, a frame, laterally disposed shafts rigidly mounted on said frame at the front and rear extremities thereof, a pair of spaced apart drums rotatively mounted on each of said shafts, a gear rigidly attached to each of said drums, a prime mover mounted on the right side of said frame and operatively connected with the right hand drums of said front and rear pairs of drums, a second prime mover mounted on the left hand side of said frame and operatively connected with the left hand drums of said front and rear pairs of drums, a cabin mounted on said frame, brackets rigidly mounted on the wall of said cabin, a block pivotally mounted on the ends of said brackets, a shaft journaled in said block, a gear on said shaft at one end, a pair of levers on the opposite side of said shaft each operatively connected with one of said prime movers for regulating the supply of fuel thereto, said block and shaft being adapted to be pivoted downwardly for raising said levers to increase the flow of fuel to both of said prime movers simultaneously and a pinion meshed with the gear of said last mentioned shaft adapted to rotate the later and the levers thereon for increasing the flow of fuel to one of said prime movers while decreasing the flow to the other for steering said vehicle.

5. A vehicle of the class described, comprising a frame, shafts disposed laterally across the front and rear ends of said frame, a pair of drums rotatively mounted on each of said shafts, a motor on the right side of said frame operatively connected with the drums of the right side of said frame, a second motor on the left side of said frame operatively connected with the drums of the left side of said frame, and controlling mechanism comprising a pivotally mounted block and a shaft journaled therein and connected with said motors and adapted to be pivoted bodily for simultaneously regulating the flow of fuel to said motors, said shaft being adapted to be rotated relative to said block for increasing the flow of fuel to one of said motors while decreasing the flow of fuel to the other.

In testimony wherof I have affixed my signature.

RALPH E. HOWELL.